United States Patent
Hong

(10) Patent No.: US 12,356,380 B2
(45) Date of Patent: Jul. 8, 2025

(54) IDENTIFIER TRANSMITTING, IDENTIFIER RECEIVING, AND INFORMATION TRANSMITTING METHODS AND DEVICES

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 530 days.

(21) Appl. No.: 17/772,508

(22) PCT Filed: Oct. 31, 2019

(86) PCT No.: PCT/CN2019/114828
§ 371 (c)(1),
(2) Date: Apr. 27, 2022

(87) PCT Pub. No.: WO2021/081926
PCT Pub. Date: May 6, 2021

(65) Prior Publication Data
US 2022/0346096 A1    Oct. 27, 2022

(51) Int. Cl.
*H04W 72/0453* (2023.01)
*H04W 8/24* (2009.01)
*H04W 16/14* (2009.01)
*H04W 72/52* (2023.01)
*H04W 72/53* (2023.01)

(52) U.S. Cl.
CPC ......... *H04W 72/0453* (2013.01); *H04W 8/24* (2013.01); *H04W 16/14* (2013.01); *H04W 72/52* (2023.01); *H04W 72/53* (2023.01)

(58) Field of Classification Search
CPC . H04W 72/0453; H04W 16/14; H04W 72/52; H04W 72/53; H04W 8/24; H04W 88/06
See application file for complete search history.

(56) References Cited

U.S. PATENT DOCUMENTS

| | | | |
|---|---|---|---|
| 9,565,693 B2* | 2/2017 | Feng | H04W 72/1215 |
| 10,264,466 B2* | 4/2019 | Yamazaki | H04B 17/15 |
| 11,265,922 B2* | 3/2022 | Tang | H04W 76/11 |
| 2013/0155991 A1* | 6/2013 | Kazmi | H04W 72/0453 |
| | | | 370/329 |

(Continued)

FOREIGN PATENT DOCUMENTS

| CN | 1981482 A | 6/2007 |
|---|---|---|
| CN | 102655637 A | 9/2012 |

(Continued)

OTHER PUBLICATIONS

International Search Report of the International Application No. PCT/CN2019/114828 dated Jul. 23, 2020 with English translation, (4p).

(Continued)

*Primary Examiner* — Raj Jain
(74) *Attorney, Agent, or Firm* — Arch & Lake LLP

(57) ABSTRACT

An identifier transmitting method. The identifier transmitting method includes: determining, by a terminal, an identifier for a licensed frequency band of the terminal; and transmitting, by the terminal via an unlicensed frequency band, the identifier to an access point for the unlicensed frequency band.

14 Claims, 10 Drawing Sheets

(56) References Cited

U.S. PATENT DOCUMENTS

| | | | |
|---|---|---|---|
| 2017/0339626 A1 | 11/2017 | Mustajarvi et al. | |
| 2018/0054836 A1* | 2/2018 | Mizikovsky | H04W 74/0816 |
| 2018/0146408 A1* | 5/2018 | Meylan | H04W 36/0085 |
| 2020/0059845 A1 | 2/2020 | Hong | |
| 2020/0145835 A1* | 5/2020 | Xu | H04L 5/0044 |
| 2020/0404648 A1* | 12/2020 | Kim | H04L 5/0044 |
| 2021/0352542 A1* | 11/2021 | Chang | H04W 48/18 |
| 2022/0346096 A1* | 10/2022 | Hong | H04W 8/26 |

FOREIGN PATENT DOCUMENTS

| | | |
|---|---|---|
| CN | 107211272 A | 9/2017 |
| CN | 109451832 A | 3/2019 |
| EP | 2293641 A3 | 4/2011 |
| EP | 2309809 A1 | 4/2011 |
| EP | 2293641 B1 | 7/2012 |
| EP | 2309809 B1 | 3/2015 |
| EP | 2293641 A2 | 3/2022 |
| WO | 2018084644 A1 | 5/2018 |

OTHER PUBLICATIONS

State Intellectual Property Office of the People's Republic of China, First Office Action and Search Report Issued in Application No. 201980002749.0, May 8, 2021, (Submitted with Machine/Partial Translation), (14p).
State Intellectual Property Office of the People's Republic of China, Second Office Action and Search Report Issued in Application No. 201980002749.0, Nov. 2, 2021, (Submitted with Machine/Partial Translation), (7p).

\* cited by examiner

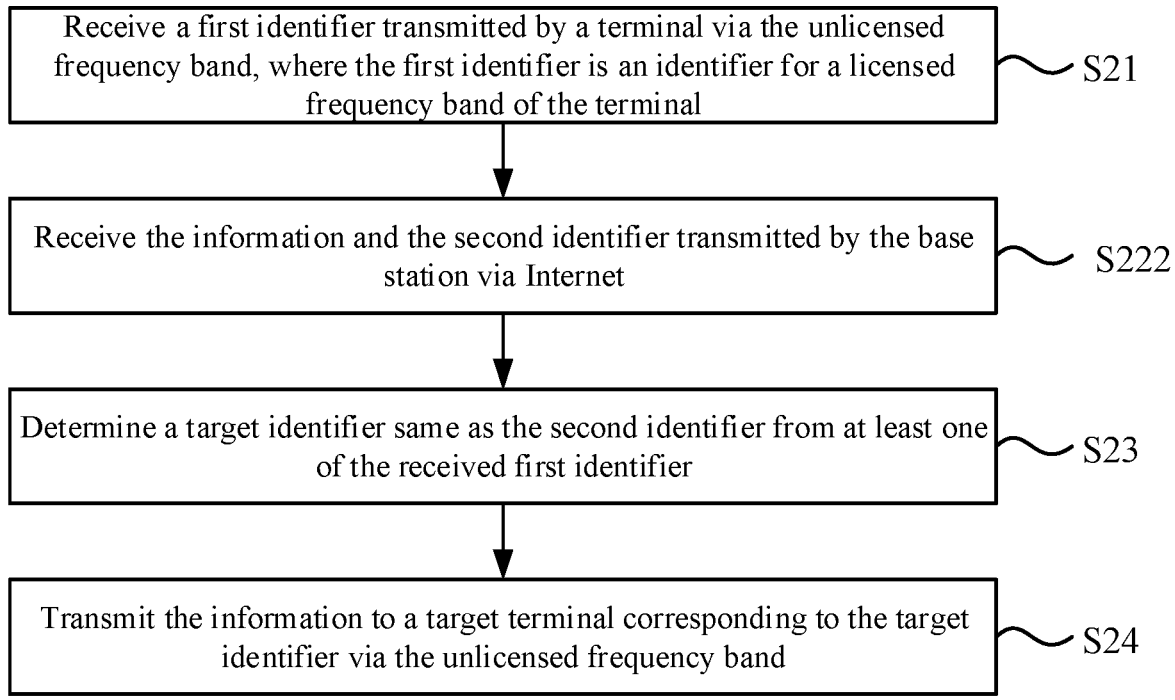

IDENTIFIER TRANSMITTING, IDENTIFIER RECEIVING, AND INFORMATION TRANSMITTING METHODS AND DEVICES

CROSS-REFERENCE TO RELATED APPLICATION

The present application is the U.S. national phase of PCT Application No. PCT/CN2019/114828 filed on Oct. 31, 2019, the disclosure of which is incorporated herein by reference in its entirety for all purposes.

TECHNICAL FIELD

The present disclosure relates to the field of communication, and in particular relates to identifier transmitting methods, identifier receiving methods, information transmitting methods, identifier transmitting devices, identifier receiving devices, information transmitting devices and electronic devices.

BACKGROUND

With the development of communication technologies, the number of users and the amount of communication data are growing rapidly, and network providers only communicate based on one or more licensed frequency bands, which is more and more difficult to meet the needs of users. In this regard, a technology that network providers use one or more unlicensed frequency bands for communication is proposed in related art, for example, network providers can use a WiFi frequency band to transmit information between a base station and a terminal under a specific condition.

SUMMARY

In this context, one or more examples of the present disclosure provide identifier transmitting methods, identifier receiving methods, information transmitting methods, identifier transmitting devices, identifier receiving devices, information transmitting devices and electronic devices to overcome the technical problems in the related art.

According to a first aspect of the present disclosure, there is provided an identifier transmitting method, being applicable to a terminal. The method includes: determining an identifier for a licensed frequency band of the terminal; and transmitting, via an unlicensed frequency band, the identifier to an access point for the unlicensed frequency band.

According to a second aspect of the present disclosure, there is provided an identifier receiving method, being applicable to an access point for an unlicensed frequency band. The method includes: receiving a first identifier transmitted by a terminal via the unlicensed frequency band, where the first identifier is an identifier for a licensed frequency band of the terminal.

According to a third aspect of the present disclosure, there is provided an information transmitting method, being applicable to a base station. The method includes: transmitting information and an identifier for a licensed frequency band of a terminal to receive the information to an access point.

BRIEF DESCRIPTION OF THE DRAWINGS

In order to more clearly illustrate the technical solutions in the examples of the present disclosure, the drawings used in the description of the examples will be briefly described below. It is obvious that the drawings in the following description are only some examples of the present disclosure, and other drawings may also be obtained from those of ordinary skill in the art in view of the drawings.

FIG. 8 is a schematic flowchart showing yet another identifier receiving method in accordance with an example of the present disclosure.

FIG. 9 is a schematic flowchart showing an information transmitting method in accordance with an example of the present disclosure.

FIG. 10 is a schematic flowchart showing another information transmitting method in accordance with an example of the present disclosure.

FIG. 11 is a schematic flowchart showing another information transmitting method in accordance with an example of the present disclosure.

DETAILED DESCRIPTION

Figure 1:
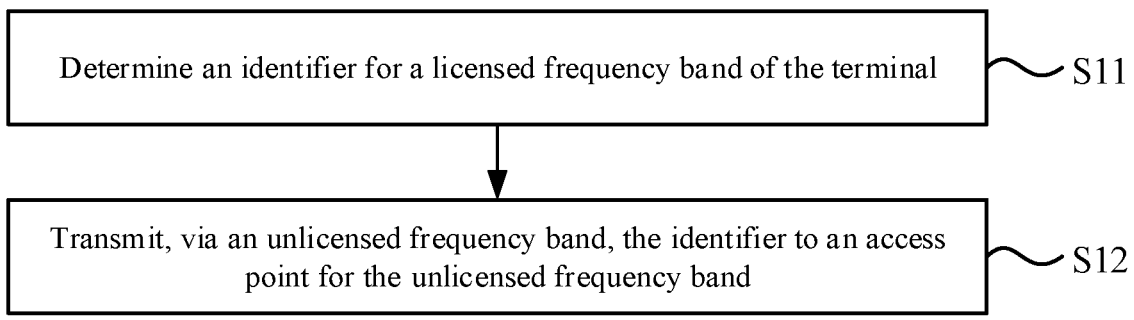
FIG. 1 is a schematic flowchart showing an identifier transmitting method in accordance with an example of the present disclosure.

The technical solutions in the examples of the present disclosure are clearly and completely described in the following with reference to the drawings in the examples of the present disclosure. It is obvious that the described examples are only a part of the examples of the present disclosure, and not all of the examples. All other examples obtained by a person of ordinary skill in the art based on the examples of the present disclosure without departing from the inventive scope are within the scope of the present disclosure.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a schematic flowchart showing an identifier transmitting method in accordance with an example of the present disclosure. The identifier transmitting method described in the present example can be applied to a terminal, which includes, but is not limited to, an electronic device such as a cell phone, a tablet computer, a wearable device, and the like. The terminal can communicate with a base station, for example, may communicate with the base station based on a 4G protocol, or may communicate with the base station based on a 5G protocol.

The terminal can also be used as a Station (STA) and access an Access Point (AP) for an unlicensed frequency band via the unlicensed frequency band, where the unlicensed frequency band includes, but is not limited to a WiFi frequency band, a Bluetooth frequency band, and the like. For example, the unlicensed frequency band is a WiFi frequency band, and the AP for the unlicensed frequency band can be a router.

As shown in FIG. 1, the identifier transmitting method can include the following steps.

At step S11, an identifier for a licensed frequency band, for example a frequency band for a network provider network, of the terminal is determined.

At step S12, the identifier is transmitted, via an unlicensed frequency band, to an access point for the unlicensed frequency band.

In an example, the terminal can determine its own identifier for the licensed frequency band. The identifier may be a temporary identifier or a permanent identifier.

The temporary identifier is an identifier configured by a base station to the terminal for the terminal to temporarily indicate its identity in certain scenarios or certain networks. For example, a terminal communicates based on a 4G protocol, the temporary identifier can be a 4G temporary identifier. For example, a terminal communicates based on a 5G protocol, the temporary identifier can be a 5G temporary identifier. The terminal communicates based on the temporary identifier, which is helpful to avoid losses due to wrongdoers obtaining the permanent identifier during communication.

The permanent identifier includes, but is not limited to, IMSI (International Mobile Subscriber Identity), IMEI (International Mobile Equipment Identity) and so on.

When the terminal determines its own identifier for the licensed frequency band, the terminal can transmit the identifier to the access point for the unlicensed frequency band through the unlicensed frequency band. For example, taking the unlicensed frequency band being a WiFi frequency band as an example, the terminal can transmit the identifier through a management frame and/or a control frame in the 802.11 protocol.

The terminal transmits its own identifier for the licensed frequency band to the access point for the unlicensed frequency band, which facilitates the access point to, in a case that the base station is to communicate with the terminal via the unlicensed frequency band, in response to receiving information from the base station, provide services to the terminal based on the identifier.

For example, when a base station is to transmit information to a terminal through an unlicensed frequency band, the base station can transmit the information and an identifier for a licensed frequency band of a terminal to receive the information to an access point. As the access point in advance received identifiers for licensed frequency band transmitted from one or more terminals, the access point can compare the identifier transmitted by the base station with the identifiers transmitted by terminals and determine a target identifier which is the same as the identifier transmitted by the base station from the identifiers transmitted by terminals. Further, the access point can determine that a target terminal corresponding to the target identifier is the terminal to receive the information transmitted by the base station, and can forward the information transmitted by the base station to the target terminal through the unlicensed frequency band.

Figure 2:
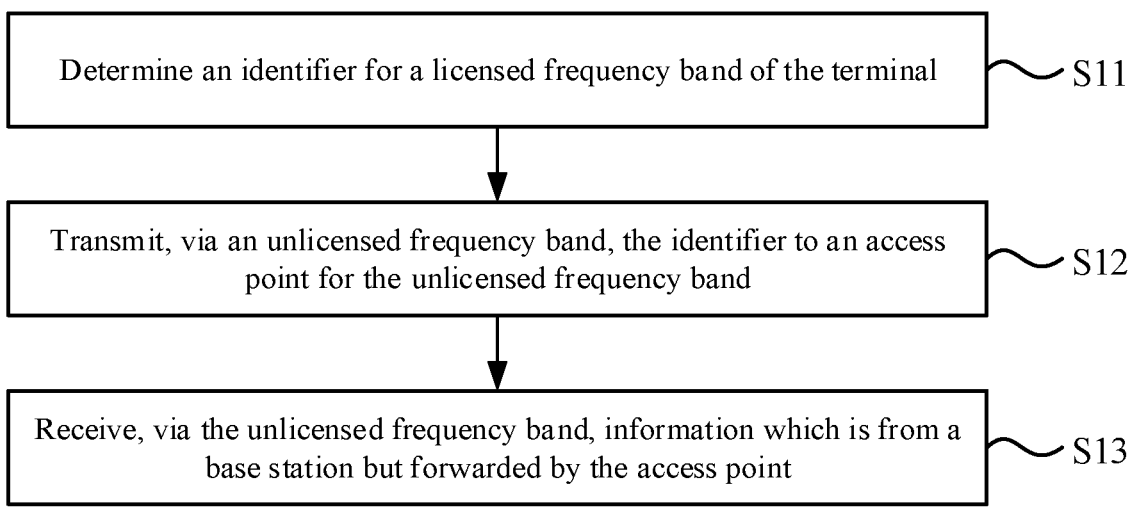
FIG. 2 is a schematic flowchart showing another identifier transmitting method in accordance with an example of the present disclosure.

FIG. 2 is a schematic flowchart showing another identifier transmitting method in accordance with an example of the present disclosure. As shown in FIG. 2, the method further includes:

At step S13, information which is from a base station but forwarded by the access point is received via the unlicensed frequency band.

In an example, the access point can receive information to be transmitted to the terminal from the base station. For example, the information and an identifier for a licensed frequency band of a terminal to receive the information can be received. And then, the access point can compare the identifier transmitted by the base station with identifiers transmitted by terminals and determine a target identifier that is the same as the identifier transmitted by the base station from the identifiers transmitted by terminals. Further, the access point can determine that a target terminal corresponding to the target identifier is the terminal to receive the information transmitted by the base station, and can forward the information transmitted by the base station to the target terminal through the unlicensed frequency band.

It is noted that in the present and subsequent examples, the information from the base station may be signaling or data. For example, the information can be paging signaling, and then after the access point transmits the paging signaling to the terminal via the unlicensed frequency band, the terminal can determine that the base station is to establish a communication connection, so that random access can be initiated to establish a communication connection with the base station.

Figure 3:
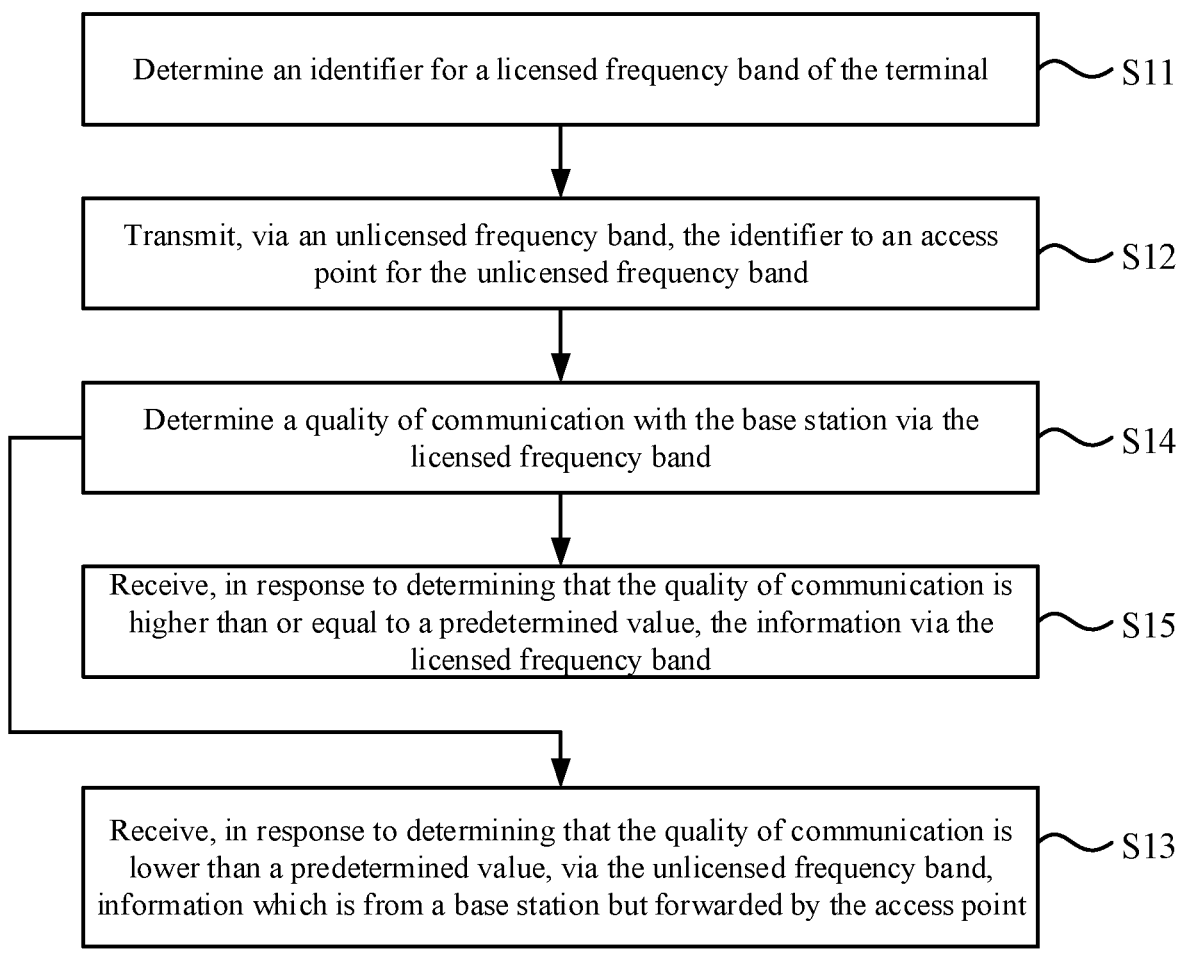
FIG. 3 is a schematic flowchart showing yet another identifier transmitting method in accordance with an example of the present disclosure.

FIG. 3 is a schematic flowchart showing yet another identifier transmitting method in accordance with an example of the present disclosure. As shown in FIG. 3, the method further includes:

At step S14, a quality of communication with the base station via the licensed frequency band is determined before receiving, via the unlicensed frequency band, the information which is from the base station but forwarded by the access point.

in response to determining that the quality of communication is lower than a predetermined value, step S13 is performed to receive, via the unlicensed frequency band, the information which is from the base station but forwarded by the access point.

At step S15, in response to determining that the quality of communication is higher than or equal to a predetermined value, the information is received via the licensed frequency band.

In an example, the terminal can detect the quality of communication with the base station via the licensed frequency band, where the quality of communication may be determined based on a parameter, for example, RSRP (Reference Signal Receiving Power) and the like.

In a case where the quality of communication is relatively low, for example, the quality of communication is lower than a predetermined value, it means that receiving information transmitted from the base station through the licensed frequency band is less reliable, and thus information which is from the base station but forwarded by the access point is to be received through the unlicensed frequency band, so as to ensure successfully receiving information from the base station. In this case, the terminal can be further set not to monitor the licensed frequency band, so to reduce the power consumption of the terminal.

In a case where the quality of communication is relatively high, for example, the quality of communication is higher than or equal to a predetermined value, it means that receiving information transmitted from the base station through the licensed frequency band is relatively reliable, and thus information is to be received directly from the base station through the licensed frequency band while without intermediate forwarding by the access point, which is conducive to reducing the time delay of receiving information.

In this case, the terminal can be further set not to monitor the unlicensed frequency band, so as to reduce the power consumption of the terminal.

Figures 4, 5:
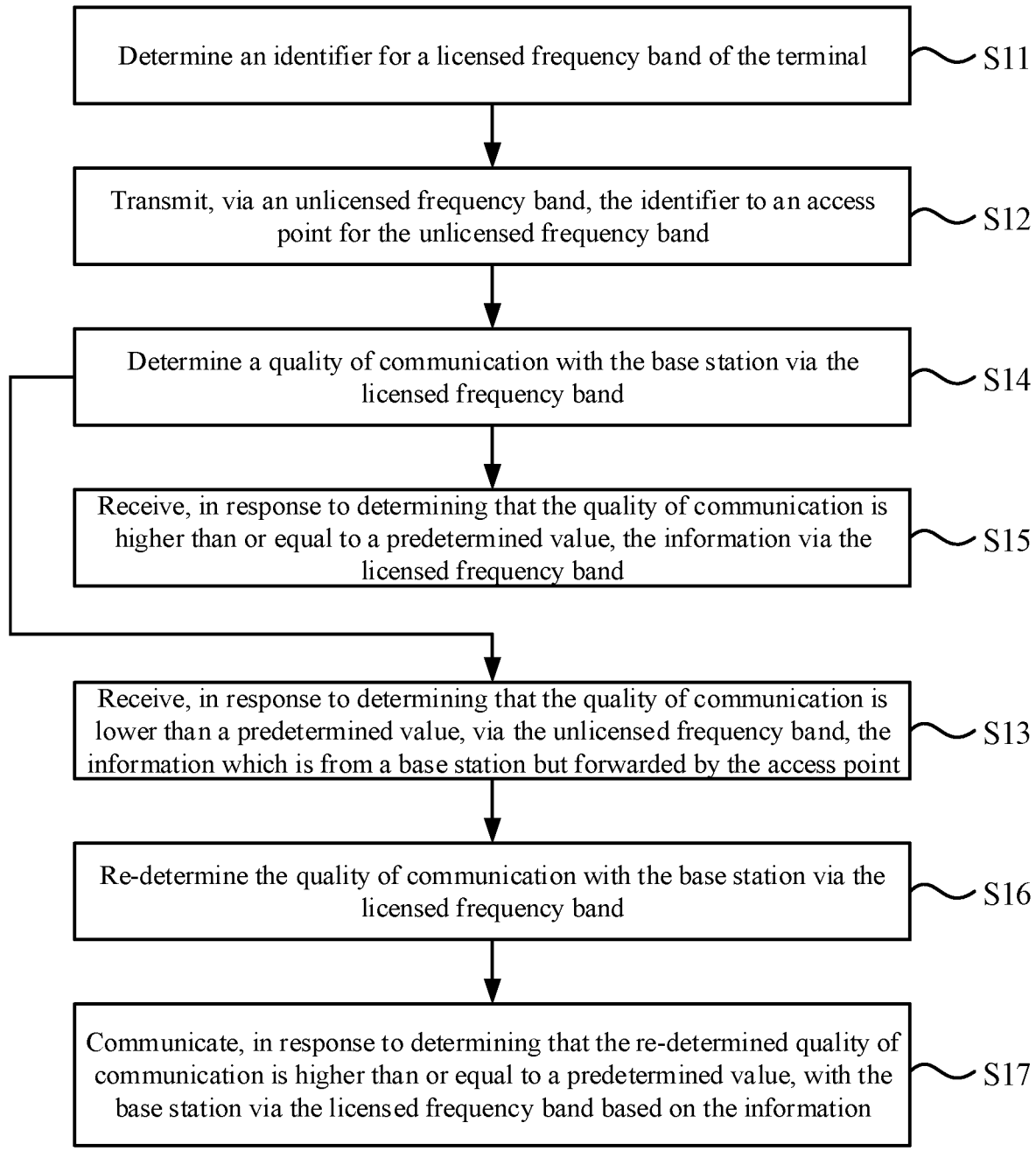
FIG. 4 is a schematic flowchart showing yet another identifier transmitting method in accordance with an example of the present disclosure.
FIG. 5 is a schematic flowchart showing an identifier receiving method in accordance with an example of the present disclosure.

FIG. 4 is a schematic flowchart showing yet another identifier transmitting method in accordance with an example of the present disclosure. As shown in FIG. 4, the method further includes:

At step S16, in response to determining that the quality of communication is lower than the predetermined value, after receiving, via the unlicensed frequency band, the information which is from the base station but forwarded by the access point, the quality of communication with the base station via the licensed frequency band is re-determined; and At step S17, in response to determining that the re-determined quality of communication is higher than or equal to a predetermined value, communication with the base station is performed via the licensed frequency band based on the information.

In an example, in a case that the quality of communication is less than the predetermined value, the terminal receives the information which is from the base station but forwarded by the access point through the unlicensed frequency band, and after receiving the information which is from the base station but forwarded by the access point through the unlicensed frequency band, the quality of communication with the base station via the licensed frequency band can be determined again. When the quality of communication determined again is greater than or equal to the predetermined value, it means that the quality of communication with the base station has improved and receiving information transmitted from the base station through the licensed frequency band is relatively reliable. And then the communication with the base station can be performed via the licensed frequency band based on the received information without the intervention of the access point, so as to avoid occupying the access point and reduce the time delay of the communication with the base station.

For example, the information from the base station is paging signaling, and then communicating with the base station via the licensed frequency band based on the information can be initiating random access via the licensed frequency band.

For example, the information from the base station is Downlink Control Information (DCI), and then communicating with the base station via the licensed frequency band based on the information can be transmitting data to the base station based on uplink resources configured according to the DCI.

In some examples, the identifier includes at least one of a temporary identifier or a permanent identifier.

In an example, the identifier transmitted by the terminal to the access point may be a temporary identifier for the licensed frequency band of the terminal, and also may be a permanent identifier for the licensed frequency band of the terminal.

The temporary identifier is an identifier configured by a base station to the terminal for the terminal to temporarily indicate its identity in certain scenarios or certain networks. For example, a terminal communicates based on a 4G protocol, the temporary identifier can be a 4G temporary identifier. For example, a terminal communicates based on a 5G protocol, the temporary identifier can be a 5G temporary identifier. The terminal communicates based on the temporary identifier, which is helpful to avoid losses due to wrongdoers obtaining the permanent identifier during communication. The permanent identifier includes, but is not limited to, IMSI, IMEI, and the like.

FIG. 5 is a schematic flowchart showing an identifier receiving method in accordance with an example of the present disclosure. The identifier receiving method shown in the present example can be applied to an access point for one or more unlicensed frequency bands, the unlicensed frequency bands include but are not limited to WiFi frequency bands, Bluetooth frequency bands, and the like. For example, an unlicensed frequency band is a WiFi frequency band, and the access point for the unlicensed frequency band can be a router.

The access point can communicate via an unlicensed frequency band with a terminal or with a base station. The terminal includes, but is not limited to, a cell phone, a tablet computer, a wearable device and other electronic devices.

As shown in FIG. 5, the identifier receiving method may include the following steps.

At step S21, a first identifier transmitted by a terminal via the unlicensed frequency band is received, where the first identifier is an identifier for a licensed frequency band of the terminal.

In an example, the access point receives a first identifier for the licensed frequency band of the terminal, which facilitates the access point to, in a case that the base station is to communicate with the terminal via the unlicensed frequency band, in response to receiving information from the base station, provide services to the terminal based on the first identifier.

For example, when a base station is to transmit information to a terminal through an unlicensed frequency band, the base station can transmit the information and a second identifier for the licensed frequency band of the terminal to receive the information to an access point. As the access point in advance received first identifiers for the licensed frequency band transmitted from one or more terminals, the access point can compare the second identifier transmitted by the base station with the first identifiers transmitted by terminals and determine a target identifier which is the same as the second identifier transmitted by the base station from the first identifiers transmitted by terminals. Further, the access point can determine that a target terminal corresponding to the target identifier is the terminal to receive the information transmitted by the base station, and can transmit the information transmitted by the base station to the target terminal through the unlicensed frequency band.

Figure 6:
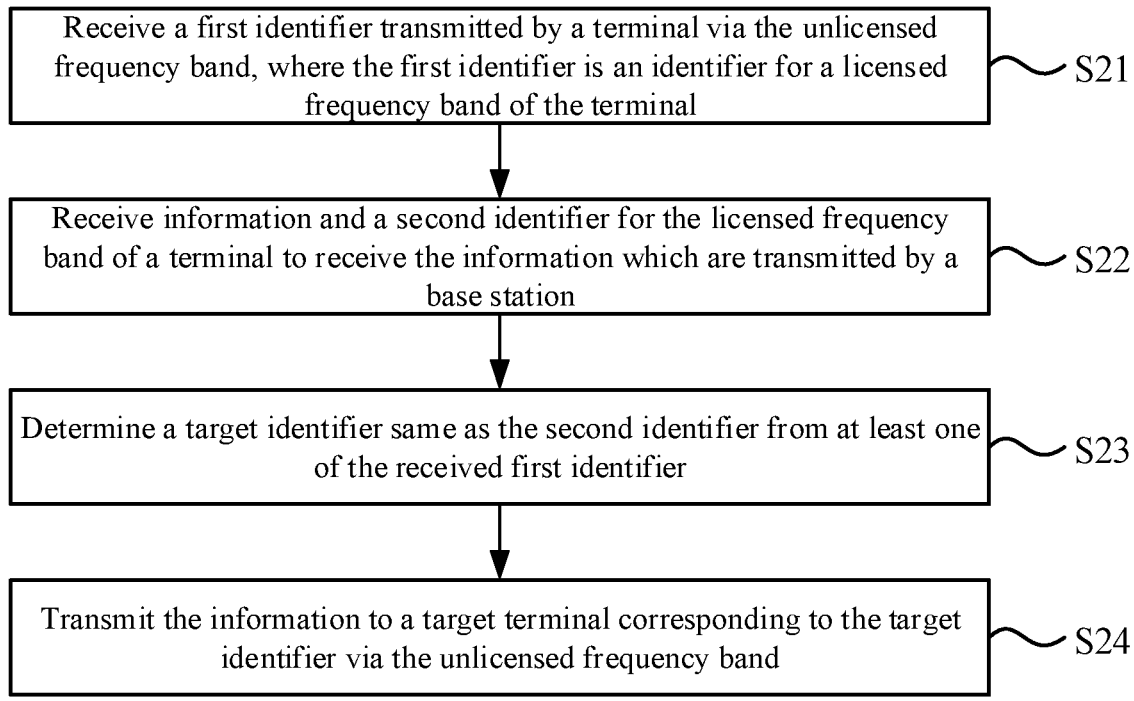
FIG. 6 is a schematic flowchart showing another identifier receiving method in accordance with an example of the present disclosure.

FIG. 6 is a schematic flowchart showing another identifier receiving method in accordance with an example of the present disclosure. As shown in FIG. 6, the method further includes:

At step S22, information and a second identifier for the licensed frequency band of a terminal to receive the information which are transmitted by a base station are received.

At step S23, a target identifier same as the second identifier is determined from at least one of the received first identifier.

At step S24, the information is transmitted to a target terminal corresponding to the target identifier via the unlicensed frequency band.

In an example, the access point can receive information and the second identifier for the licensed frequency band of the terminal to receive the information which are transmitted by the base station. And then the access point can compare the second identifier with the at least one received first identifier, so as to determine a target identifier that is the same as the second identifier from the at least one first identifier. Thus, as a target terminal corresponding to the target identifier is the terminal to receive the information transmitted by the base station, the information transmitted by the base station can be transmitted to the target terminal through the unlicensed frequency band.

Figure 7:
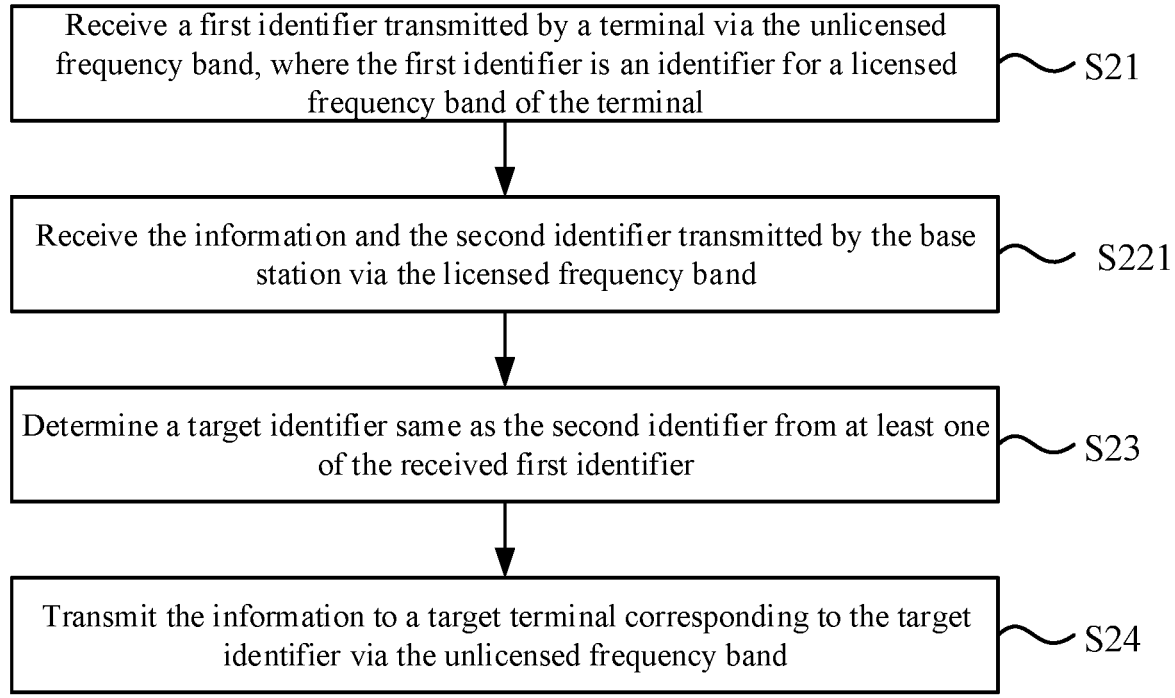
FIG. 7 is a schematic flowchart showing yet another identifier receiving method in accordance with an example of the present disclosure.

FIG. 7 is a schematic flowchart showing yet another identifier receiving method in accordance with an example of the present disclosure. As shown in FIG. 7, receiving the information and the second identifier for the licensed frequency band of the terminal to receive the information which are transmitted by the base station includes:

At step S221, the information and the second identifier transmitted by the base station are received via the licensed frequency band.

In an example, in a case that the access point can communicate with the base station via the licensed frequency band, the access point can receive directly the information and the second identifier transmitted by the base station via the licensed frequency band.

FIG. 8 is a schematic flowchart showing yet another identifier receiving method in accordance with an example of the present disclosure. As shown in FIG. 8, receiving the information and the second identifier for the licensed frequency band of the terminal to receive the information which are transmitted by the base station includes:

At step S222, the information and the second identifier transmitted by the base station are received via Internet.

In an example, the access point may be connected to the Internet, and then the base station can transmit the information and the second identifier to a core network which forwards the information and the second identifier to the access point via the Internet.

For example, the access point is connected to the Internet but cannot communicate with the base station via the licensed frequency band, and then the information and the second identifier may be received according to the manner of the example shown in FIG. 8. For example, the access point is not connected to the Internet but can communicate with the base station via the licensed frequency band, and then the information and the second identifier may be received according to the manner of the example shown in FIG. 7. For example, the access point is not only connected to the Internet, but also can communicate with the base station via the licensed frequency band, and then the information and the second identifier may be received according to the manner of the example shown in FIG. 7 or FIG. 8, as desired.

It is noted that the base station and the access point can communicate according to, besides the examples shown in FIG. 7 and FIG. 8 described above, other ways. For example, a wired connection is configured between the base station and the access point, which can indicate specifically a cable, an optical fiber, and the like, so that the base station can transmit the information and the second identifier to the access point through the wired connection. For example, the base station and the access point are set in an electronic device, and the base station and the access point are connected to each other through one or more circuits and interfaces within the electronic device. And then the base station can transmit the information and the second identifier to the access point through the circuits and interfaces.

In some examples, the first identifier includes a temporary identifier and/or a permanent identifier.

In an example, the identifier transmitted by the terminal to the access point may be a temporary identifier for the licensed frequency band of the terminal, and also may be a permanent identifier for the licensed frequency band of the terminal.

The temporary identifier is an identifier configured by a base station to the terminal for the terminal to temporarily indicate its identity in certain scenarios or certain networks. For example, a terminal communicates based on a 4G protocol, the temporary identifier can be a 4G temporary identifier. For example, a terminal communicates based on a 5G protocol, the temporary identifier can be a 5G temporary identifier. The terminal communicates based on the temporary identifier, which is helpful to avoid losses due to wrongdoers obtaining the permanent identifier during communication. The permanent identifier includes, but is not limited to, IMSI, IMEI, and the like.

FIG. 9 is a schematic flowchart showing an information transmitting method in accordance with an example of the present disclosure. The information transmitting method shown in the present example can be applied to a base station. The base station can communicate with a terminal, for example, based on a 4G protocol or based on a 5G protocol. The terminal further communicates with an access point for an unlicensed frequency band. The unlicensed frequency band includes, but is not limited to a WiFi frequency band, Bluetooth frequency band, and the like. For example, the unlicensed frequency band is a WiFi frequency band, and the access point for the unlicensed frequency band can be a router. The terminal includes, but is not limited to, a cell phone, a tablet computer, a wearable device and other electronic devices.

As shown in FIG. 9, the information transmitting method may include the following steps.

At step S31, information and an identifier for a licensed frequency band of a terminal to receive the information are transmitted to an access point.

In an example, the base station transmits information and the identifier for the licensed frequency band of the terminal to receive the information to the access point for the unlicensed frequency band, which facilitates the access point to, in a case that the base station is to communicate with the terminal via the unlicensed frequency band, in response to receiving information from the base station, provide services to the terminal based on the identifier.

For example, when a base station is to transmit information to a terminal through an unlicensed frequency band, the base station can transmit the information and an identifier for a licensed frequency band of a terminal to receive the information to an access point. As the access point in advance received identifiers for licensed frequency band transmitted from one or more terminals, the access point can compare the identifier transmitted by the base station with the identifiers transmitted by terminals and determine a target identifier which is the same as the identifier transmitted by the base station from the identifiers transmitted by terminals. Further, the access point can determine that a target terminal corresponding to the target identifier is the terminal to receive the information transmitted by the base station, and can transmit the information transmitted by the base station to the target terminal through the unlicensed frequency band.

FIG. 10 is a schematic flowchart showing another information transmitting method in accordance with an example of the present disclosure. As shown in FIG. 10, the method further includes:

At step S32, before transmitting the information and the identifier for the licensed frequency band of the terminal to receive the information to the access point, a target access point to which the terminal is connected via an unlicensed frequency band is determined.

Transmitting the information and the identifier for the licensed frequency band of the terminal to receive the information to the access point includes:

At step S311, the information and the identifier are transmitted to the target access point.

In an example, before transmitting information and the identifier for the licensed frequency band of a terminal to receive the information to the access point, the target access point to which the terminal is connected via the unlicensed frequency band can be determined first. And then, when transmitting the information and the identifier, the information and the identifier can be transmitted to the target access point. Since the target access point is connected to the terminal via the unlicensed frequency band, it can ensure that the target access point can transmit the information to the terminal via the unlicensed frequency band.

FIG. 11 is a schematic flowchart showing another information transmitting method in accordance with an example of the present disclosure. As shown in FIG. 11, transmitting information and the identifier for the licensed frequency band of the terminal to receive the information to the access point includes:

At step S312, the information and the identifier are transmitted to any access point that has a communication connection with the base station.

In an example, the base station can determine all access points that have a communication connection with itself, and then transmit the information and the identifier to each access point. Thus, no complex operations are performed before transmitting the information and the identifier to the access point, which ensures that the information and the identifier can be transmitted quickly to the access point. Further, the access point transmits the information to a terminal corresponding to the identifier via the unlicensed frequency band.

Figure 12:
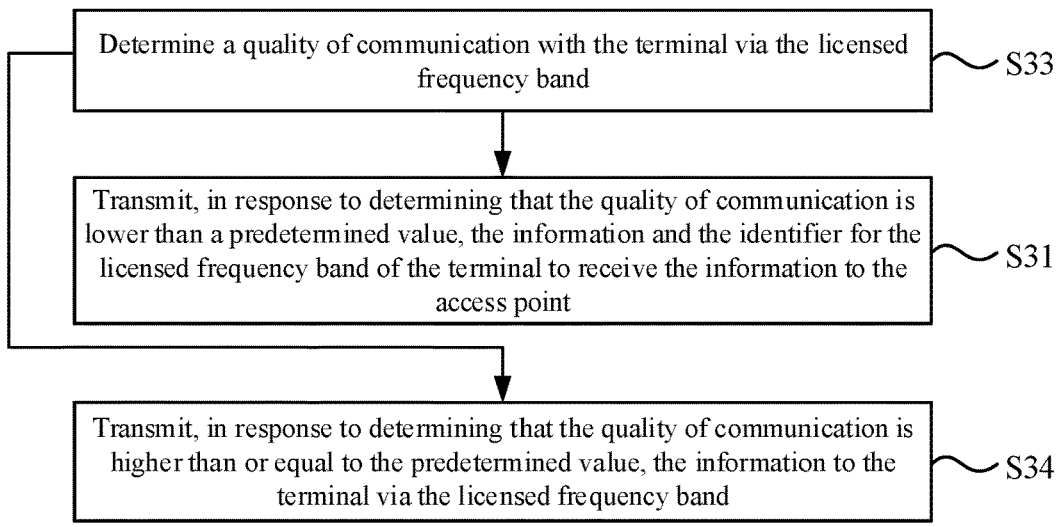
FIG. 12 is a schematic flowchart showing yet another information transmitting method in accordance with an example of the present disclosure.

FIG. 12 is a schematic flowchart showing yet another information transmitting method in accordance with an example of the present disclosure. As shown in FIG. 12, the method further includes:

At step S33, before transmitting information and the identifier for the licensed frequency band of the terminal to receive the information to the access point, a quality of communication with the terminal via the licensed frequency band is determined.

In response to determining that the quality of communication is lower than a predetermined value, step S31 is performed to transmit the information and the identifier to the access point.

At step S34, in response to determining that the quality of communication is higher than or equal to a predetermined value, the information is transmitted to the terminal via the licensed frequency band.

In an example, the base station can detect the quality of communication with the terminal via the licensed frequency band, where the quality of communication may be determined based on a parameter, for example, RSRP and the like.

In a case where the quality of communication is relatively low, for example, the quality of communication is lower than a predetermined value, it means that transmitting information to a terminal through the licensed frequency band is less reliable. Therefore, the information and the identifier can be transmitted to the access point, and then the access point can forward the information to the terminal through the licensed frequency band, so as to ensure successfully transmitting information to the terminal.

In a case where the quality of communication is relatively high, for example, the quality of communication is higher than or equal to a predetermined value, it means that transmitting information to a terminal through the licensed frequency band is relatively reliable. Therefore, the information can be transmitted directly to the terminal through the licensed frequency band while without intermediate forwarding by the access point, which is conducive to reducing the time delay of receiving information.

Figure 13:
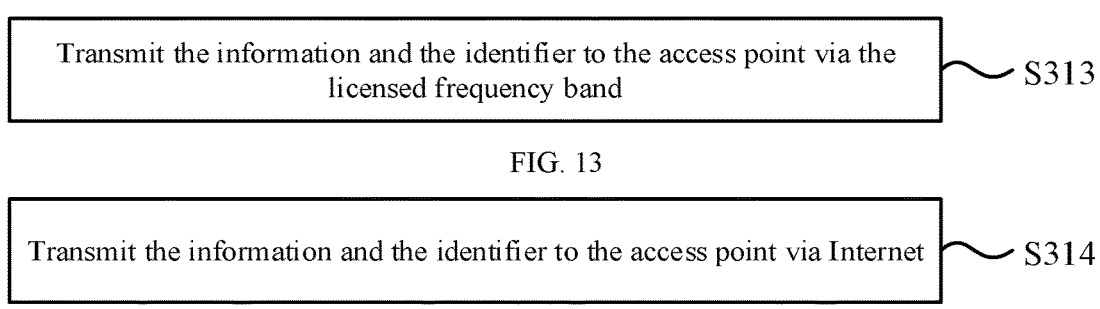
FIG. 13 is a schematic flowchart showing yet another information transmitting method in accordance with an example of the present disclosure.

FIG. 13 is a schematic flowchart showing yet another information transmitting method in accordance with an example of the present disclosure. As shown in FIG. 13, transmitting the information and the identifier for the licensed frequency band of the terminal to receive the information to the access point includes:

At step S313, the information and the identifier are transmitted to the access point via the licensed frequency band.

In an example, in a case that the access point can communicate with the base station via the licensed frequency band, the access point can receive directly the information and the second identifier transmitted by the base station through the licensed frequency band.

Figure 14:
FIG. 14 is a schematic flowchart showing yet another information transmitting method in accordance with an example of the present disclosure.

FIG. 14 is a schematic flowchart showing yet another information transmitting method in accordance with an example of the present disclosure. As shown in FIG. 14, transmitting the information and the identifier for the licensed frequency band of the terminal to receive the information to the access point includes:

At step S314, the information and the identifier are transmitted to the access point via Internet.

In an example, the access point may be connected to the Internet, and then the base station can transmit the information and the second identifier to a core network which forwards the information and the second identifier to the access point via the Internet.

For example, the access point is connected to the Internet but cannot communicate with the base station via the licensed frequency band, and then the information and the second identifier may be transmitted according to the manner of the example shown in FIG. 14. For example, the access point is not connected to the Internet but can communicate with the base station via the licensed frequency band, and then the information and the second identifier may be transmitted according to the manner of the example shown in FIG. 13. For example, the access point is not only connected to the Internet, but also can communicate with the base station via the licensed frequency band, and then the information and the second identifier may be transmitted according to the manner of the example shown in FIG. 13 or FIG. 14, as desired.

It is noted that the base station and the access point can communicate according to, besides the examples shown in FIG. 13 and FIG. 14 described above, other ways. For example, a wired connection is configured between the base station and the access point, which can indicate specifically a cable, an optical fiber, and the like, so that the base station can transmit the information and the second identifier to the access point through the wired connection. For example, the base station and the access point are set in an electronic device, and the base station and the access point are connected to each other through one or more circuits and interfaces within the electronic device. And then the base station can transmit the information and the second identifier to the access point through the circuits and interfaces.

Corresponding to the examples of the identifier transmitting method, the identifier receiving method and the information transmitting method described above, the present disclosure also provides examples of an identifier transmitting device, an identifier receiving device and an information transmitting device.

Figure 15:
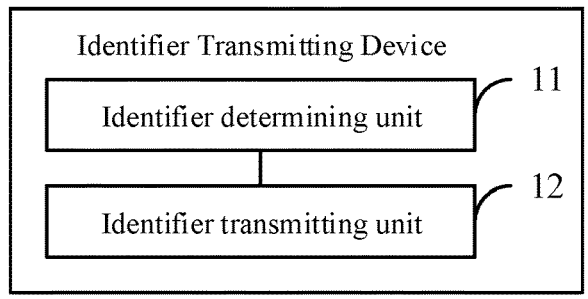
FIG. 15 is a schematic block diagram showing an identifier transmitting device in accordance with an example of the present disclosure.

FIG. 15 is a schematic block diagram showing an identifier transmitting device in accordance with an example of the present disclosure. The identifier transmitting device described in the present example can be applied to a terminal, which includes, but is not limited to, an electronic device such as a cell phone, a tablet computer, a wearable device, and the like. The terminal can communicate with a base station, for example, may communicate with the base station based on a 4G protocol, or may communicate with the base station based on a 5G protocol.

The terminal can access an access point for an unlicensed frequency band via the unlicensed frequency band, where the unlicensed frequency band includes, but is not limited to a WiFi frequency band, a Bluetooth frequency band, and the like. For example, the unlicensed frequency band is a WiFi frequency band, and the access point for the unlicensed frequency band can be a router.

As shown in FIG. 15, the device may include:
an identifier determining unit 11, configured to determine an identifier for a licensed frequency band of the terminal; and
an identifier transmitting unit 12, configured to transmit, via an unlicensed frequency band, the identifier to an access point for the unlicensed frequency band.

Figure 16:
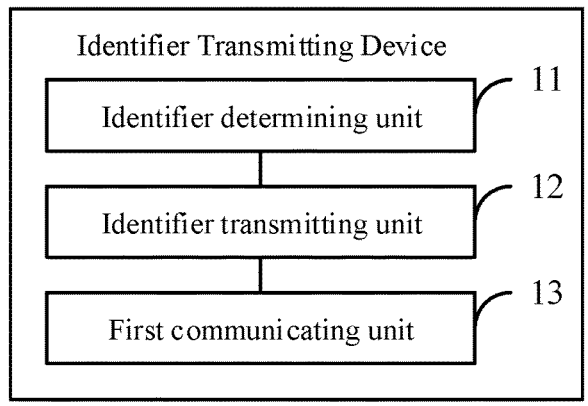
FIG. 16 is a schematic block diagram showing another identifier transmitting device in accordance with an example of the present disclosure.

FIG. 16 is a schematic block diagram showing another identifier transmitting device in accordance with an example of the present disclosure. As shown in FIG. 16, the device further includes:
a first communicating unit 13, configured to receive, via the unlicensed frequency band, information which is from a base station but forwarded by the access point.

Figure 17:
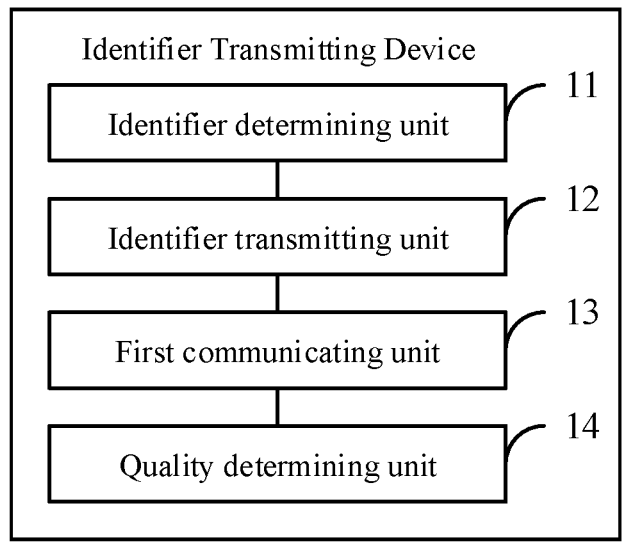
FIG. 17 is a schematic block diagram showing yet another identifier transmitting device in accordance with an example of the present disclosure.

FIG. 17 is a schematic block diagram showing yet another identifier transmitting device in accordance with an example of the present disclosure. As shown in FIG. 17, the device further includes:
a quality determining unit 14, configured to determine a quality of communication with the base station via the licensed frequency band;
where the first communicating unit 13 is configured to receive, via the unlicensed frequency band, the information which is from the base station but forwarded by the access point, in response to determining that the quality of communication is lower than a predetermined value; and receive the information via the licensed frequency band, in response to determining that the quality of communication is higher than or equal to the predetermined value.

Figure 18:
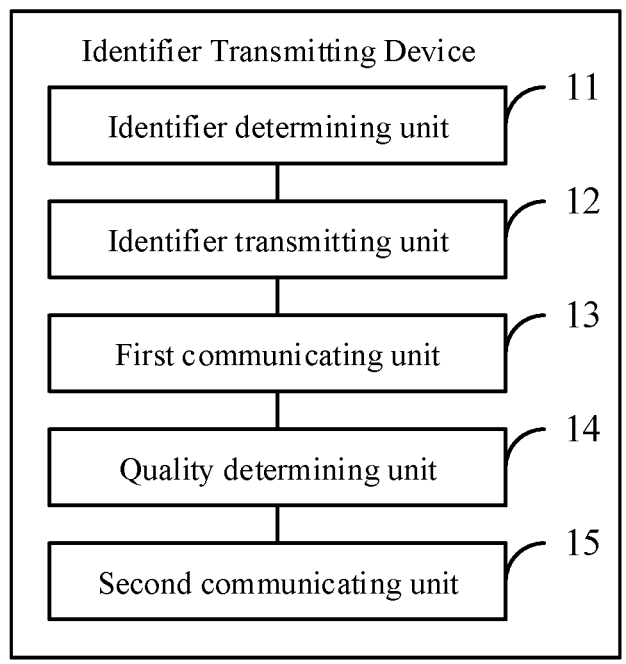
FIG. 18 is a schematic block diagram showing yet another identifier transmitting device in accordance with an example of the present disclosure.

FIG. 18 is a schematic block diagram showing yet another identifier transmitting device in accordance with an example of the present disclosure. As shown in FIG. 18, the quality determining unit 14 is further configured to, in response to determining that the quality of communication is lower than the predetermined value, after receiving, via the unlicensed frequency band, the information which is from the base station but forwarded by the access point, re-determine the quality of communication with the base station via the licensed frequency band;

the device further includes:
a second communicating unit 15 configured to, in response to determining that the re-determined quality of communication is higher than or equal to the predetermined value, communicate with the base station via the licensed frequency band based on the information.

In some examples, the identifier includes at least one of a temporary identifier or a permanent identifier.

Figure 19:
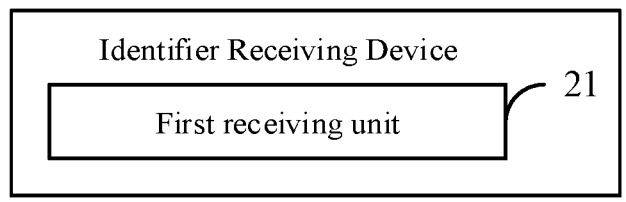
FIG. 19 is a schematic block diagram showing an identifier receiving device in accordance with an example of the present disclosure.

FIG. 19 is a schematic block diagram showing an identifier receiving device in accordance with an example of the present disclosure. The identifier receiving device shown in the present example can be applied to an access point for one or more unlicensed frequency bands, the unlicensed frequency bands include but are not limited to WiFi frequency bands, Bluetooth frequency bands, and the like. For example, an unlicensed frequency band is a WiFi frequency band, and the access point for the unlicensed frequency band can be a router.

The access point can communicate via an unlicensed frequency band with a terminal or with a base station. The terminal includes, but is not limited to, a cell phone, a tablet computer, a wearable device and other electronic devices.

As shown in FIG. 19, the identifier receiving device may include:
a first receiving unit 21, configured to receive a first identifier transmitted by a terminal via the unlicensed frequency band, where the first identifier is an identifier for a licensed frequency band of the terminal.

Figure 20:
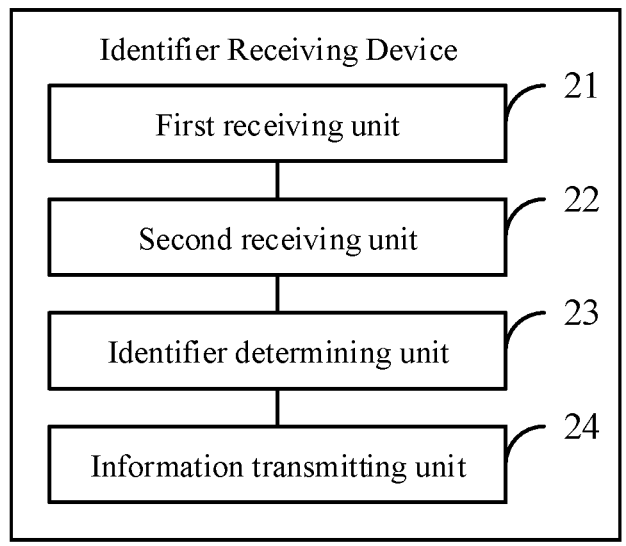
FIG. 20 is a schematic block diagram showing another identifier receiving device in accordance with an example of the present disclosure.

FIG. 20 is a schematic block diagram showing another identifier receiving device in accordance with an example of the present disclosure. As shown in FIG. 20, the device further includes:
a second receiving unit 22, configured to receive information and a second identifier for the licensed frequency band of a terminal to receive the information which are transmitted by a base station;
an identifier determining unit 23, configured to determine a target identifier from at least one of the received first identifier, where the target identifier is same as the second identifier; and
an information transmitting unit 24, configured to transmit, via the unlicensed frequency band, the information to a target terminal corresponding to the target identifier.

In some examples, the second receiving unit is configured to receive, via the licensed frequency band, the information and the second identifier transmitted by the base station.

In some examples, the second receiving unit is configured to receive via Internet, the information and the second identifier transmitted by the base station.

In some examples, the first identifier includes at least one of a temporary identifier or a permanent identifier.

Figure 21:
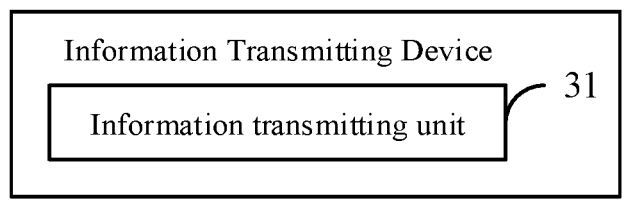
FIG. 21 is a schematic block diagram showing an information transmitting device in accordance with an example of the present disclosure.

FIG. 21 is a schematic block diagram showing an information transmitting device in accordance with an example of the present disclosure. The information transmitting device shown in the present example can be applied to a base station. The base station can communicate with a terminal, for example, based on a 4G protocol or based on a 5G protocol. The terminal further communicates with an access point for an unlicensed frequency band. The unlicensed frequency band includes, but is not limited to a WiFi frequency band, a Bluetooth frequency band, and the like. For example, the unlicensed frequency band is a WiFi frequency band, and the access point for the unlicensed frequency band can be a router. The terminal includes, but is not limited to, a cell phone, a tablet computer, a wearable device and other electronic devices.

As shown in FIG. 21, the information transmitting device may include:
an information transmitting unit 31, configured to transmit information and an identifier for a licensed frequency band of a terminal to receive the information to an access point.

Figure 22:
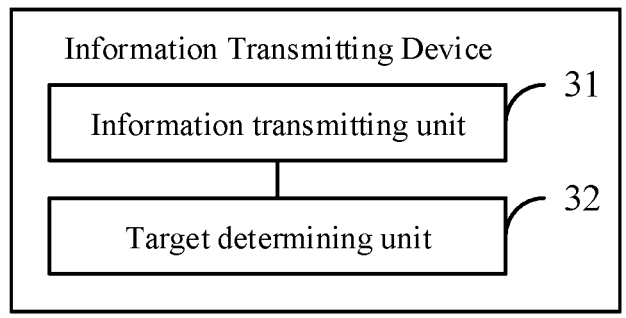
FIG. 22 is a schematic block diagram showing another information transmitting device in accordance with an example of the present disclosure.

FIG. 22 is a schematic block diagram showing another information transmitting device in accordance with an example of the present disclosure. As shown in FIG. 22, the device further includes:
a target determining unit 32, configured to determine a target access point to which the terminal is connected via an unlicensed frequency band;
where the information transmitting unit 31 is configured to transmit the information and the identifier to the target access point.

In some examples, the information transmitting unit is configured to transmit the information and the identifier to any access point that has a communication connection with the base station.

Figure 23:
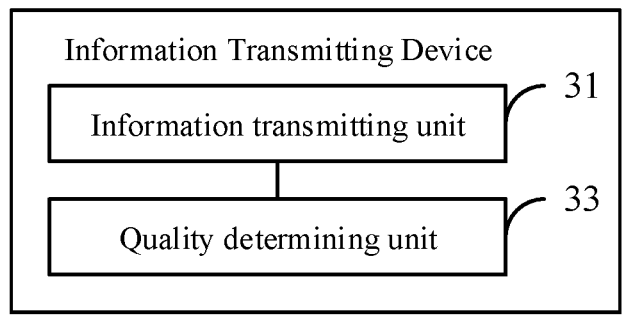
FIG. 23 is a schematic block diagram showing another information transmitting device in accordance with an example of the present disclosure.

FIG. 23 is a schematic block diagram showing another information transmitting device in accordance with an example of the present disclosure. As shown in FIG. 23, the device further includes:
a quality determining unit 33, configured to determine a quality of communication with the terminal via the licensed frequency band;
where the information transmitting unit 31 is configured to transmit, in response to determining that the quality of communication is lower than a predetermined value, the information and the identifier to the access point; and transmit, in response to determining that the quality of communication is higher than or equal to the predetermined value, the information to the terminal via the licensed frequency band.

In some examples, the information transmitting unit is configured to transmit the information and the identifier to the access point via the licensed frequency band.

In some examples, the information transmitting unit is configured to transmit, via Internet, the information and the identifier to the access point.

With regard to the device in the above examples, the specific manner in which the respective modules perform the operations has been described in detail in the examples of the related methods, and will not be explained in detail herein.

Since the device examples substantially correspond to the method examples, a reference may be made to part of the descriptions of the method examples for the related part. The device examples described above are merely illustrative, where the units described as separate members may be or not be physically separated, and the members displayed as units may be or not be physical units, i.e., may be located in one place, or may be distributed to a plurality of network units. Part or all of the modules may be selected according to actual requirements to implement the objectives of the solutions in the examples. Those of ordinary skill in the art may understand and carry out them without creative work.

The examples of the present disclosure also provide an electronic device, including:

a processor;

a memory for storing executable instructions by the processor;

where the processor is configured to perform the identifier transmitting method of any one of the above examples.

The examples of the present disclosure also provide an electronic device, including:

a processor;

a memory for storing executable instructions by the processor;

where the processor is configured to perform the identifier receiving method of any one of the above examples.

The examples of the present disclosure also provide an electronic device, including:

a processor;

a memory for storing executable instructions by the processor;

where the processor is configured to perform the information transmitting method of any one of the above examples.

Figure 24:
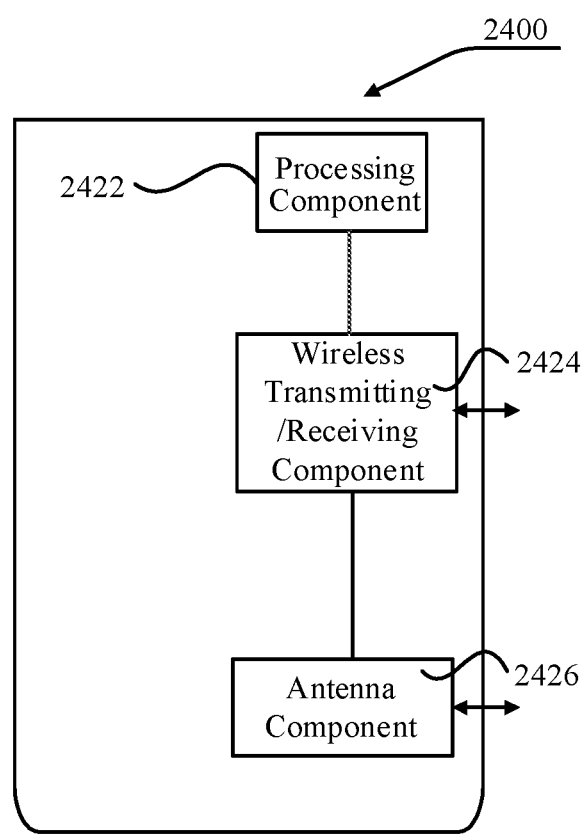
FIG. 24 is a schematic block diagram showing a device for transmitting information in accordance with an example of the present disclosure.

As shown in FIG. 24, FIG. 24 is a schematic block diagram showing a device for transmitting information in accordance with an example of the present disclosure. The device 2400 may be provided as a base station. Referring to FIG. 24, the device 2400 includes a processing component 2422, a wireless transmitting/receiving component 2424, an antenna component 2426 and a signal processing portion specific to a wireless interface. The processing component 2422 may further include one or more processors. One of the processors in the processing component 2422 may be configured to implement the information transmitting method described in any one of the above examples.

Figure 25:
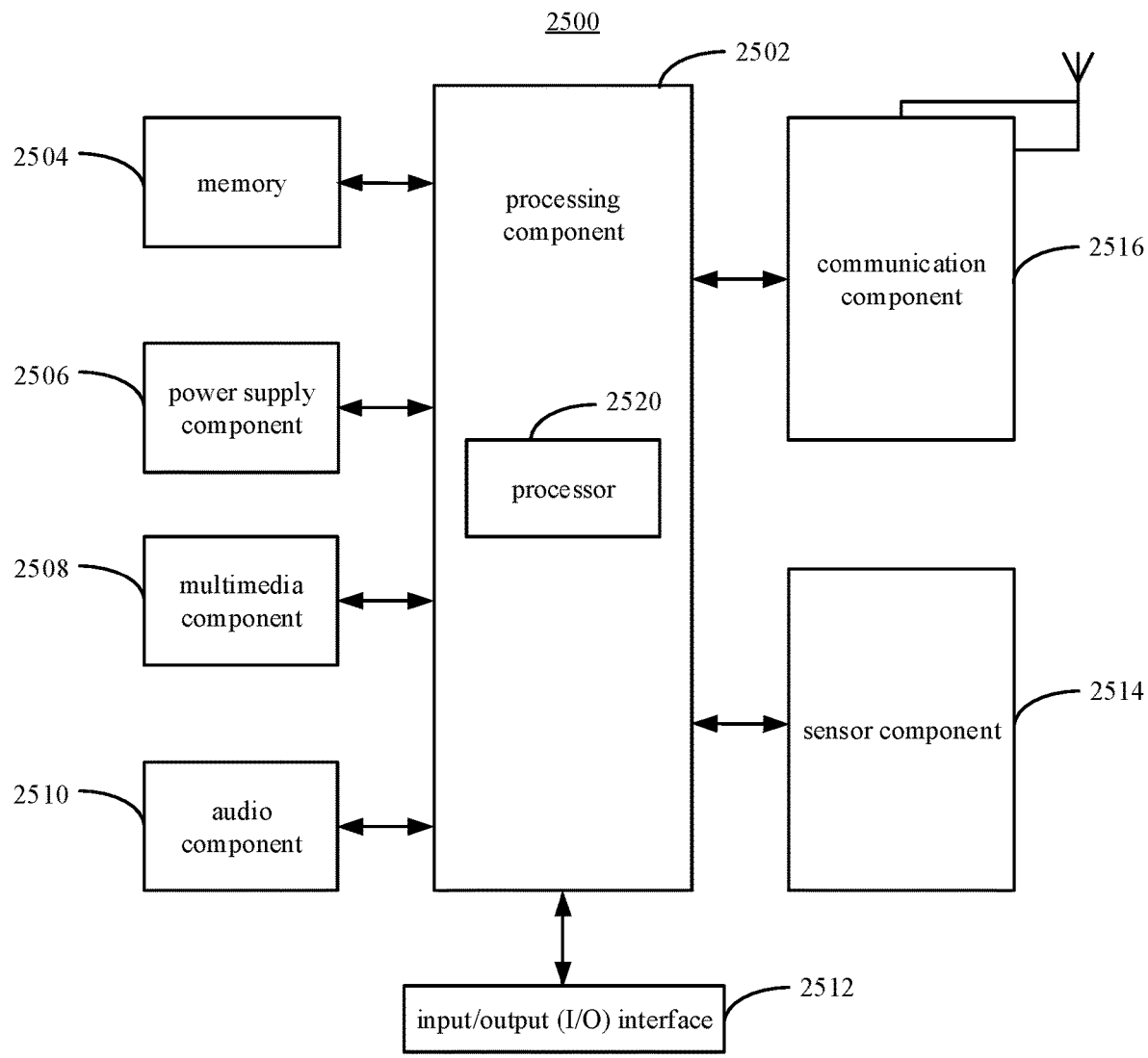
FIG. 25 is a schematic block diagram showing a device for transmitting an identifier in accordance with an example of the present disclosure.

FIG. 25 is a schematic block diagram illustrating a device 2500 for transmitting an identifier in accordance with an example of the present disclosure. For example, the apparatus 2500 may be a mobile phone, a computer, a digital broadcast terminal, a message transceiving device, a game console, a tablet device, a medical device, a fitness device and a personal digital assistant and the like.

As shown in FIG. 25, the device 2500 may include one or more of the following components: a processing component 2502, a memory 2504, a power supply component 2506, a multimedia component 2508, an audio component 2510, an input/output (I/O) interface 2512, a sensor component 2514 and a communication component 2516.

The processing component 2502 generally controls overall operations of the apparatus 2500, such as operations associated with display, phone calls, data communications, camera operations, and recording operations. The processing component 2502 may include one or more processors 2520 to execute instructions to complete all or part of the steps of the identifier transmitting method in any of the above examples. In addition, the processing component 2502 may include one or more modules which facilitate the interaction between the processing component 2502 and other components. For example, the processing component 2502 may include a multimedia module to facilitate the interaction between the multimedia component 2508 and the processing component 2502.

The memory 2504 is configured to store various types of instructions and/or data to support the operation of the device 2500. Examples of such instructions and/or data include instructions for any application or method operated on the device 2500, contact data, phonebook data, messages, pictures, videos, and so on. The memory 2504 may be implemented by any type of volatile or non-volatile storage devices or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic or compact disk.

The power supply component 2506 supplies power for different components of the device 2500. The power supply component 2506 may include a power supply management system, one or more power supplies, and other components associated with generating, managing and distributing power for the device 2500.

The multimedia component 2508 includes a screen that provides an output interface between the device 2500 and a user. In some examples, the screen may include a liquid crystal display (LCD) and a touch panel (TP). If the screen includes a touch panel, the screen may be implemented as a touch screen to receive input signals from the user. The touch panel includes one or more touch sensors to sense touches, slides, and gestures on the touch panel. The touch sensor may not only sense the boundary of touch or slide actions but also detect the duration and pressure associated with touch or slide operations. In some examples, the multimedia component 2508 includes a front camera and/or a rear camera. When the device 2500 is in an operation mode, such as a shooting mode or a video mode, the front camera and/or the rear camera may receive external multimedia data. Each of the front and rear cameras may be a fixed optical lens system or have a focal length and an optical zoom capability.

The audio component 2510 is configured to output and/or input audio signals. For example, the audio component 2510 includes a microphone (MIC) configured to receive an external audio signal when the device 2500 is in an operation mode, such as a call mode, a recording mode, and a voice recognition mode. The received audio signal may be further stored in the memory 2504 or transmitted via the communication component 2516. In some examples, the audio component 2510 also includes a loudspeaker for outputting an audio signal.

The I/O interface 2512 provides an interface between the processing component 2502 and a peripheral interface module which may be a keyboard, a click wheel, a button, or the like. These buttons may include, but are not limited to a home button, a volume button, a start button, and a lock button.

The sensor component 2514 includes one or more sensors for providing a status assessment in various aspects to the device 2500. For example, the sensor component 2514 may detect an open/closed state of the device 2500, and the relative positioning of components, for example, the component is a display and a keypad of the device 2500. The sensor component 2514 may also detect a change in position of the device 2500 or a component of the device 2500, the presence or absence of a user in contact with the device 2500, the orientation or acceleration/deceleration of the device 2500 and a change in temperature of the device 2500. The sensor component 2514 may include a proximity sensor configured to detect the presence of nearby objects without any physical contact. The sensor component 2514 may also include a light sensor, such as a CMOS or CCD image sensor, for use in imaging applications. In some examples, the sensor component 2514 may also include an acceleration sensor, a gyro sensor, a magnetic sensor, a pressure sensor, or a temperature sensor.

The communication component 2516 is configured to facilitate wired or wireless communication between the device 2500 and other devices. The device 2500 may access a wireless network based on a communication standard, such as WiFi, 2G or 3G, 4G LTE, 5G NR or a combination thereof. In an example, the communication component 2516 receives broadcast signals or broadcast associated information from an external broadcast management system via a broadcast channel. In an example, the communication component 2516 also includes a near field communication (NFC) module to facilitate short range communication. For example, the NFC module may be implemented based on a radio frequency identification (RFID) technology, an infrared data association (IrDA) technology, an ultrawideband (UWB) technology, a Bluetooth (BT) technology, and other technologies.

In an example, the device 2500 may be implemented by one or more of an application specific integrated circuit (ASIC), a digital signal processor (DSP), a digital signal processing device (DSPD), a programmable logic device (PLD), a field programmable gate array (FPGA), a controller, a microcontroller, a microprocessor or other electronic elements for performing the identifier transmitting method described in any of the above examples.

In an example, there is also provided a non-transitory computer readable storage medium including computer program instructions, such as a memory 2504, where the instructions are executable by the processor 2520 of the apparatus 2500 to perform the method as described above. For example, the non-transitory computer readable storage medium may be ROM, RAM, CD-ROM, magnetic tape, floppy disk, and optical data storage device and the like.

According to examples of the present disclosure, the terminal transmits its own identifier for the licensed frequency band to the access point for the unlicensed frequency band, which facilitates the access point to, in a case that the base station is to communicate with the terminal via the unlicensed frequency band, in response to receiving information from the base station, provide services to the terminal based on the identifier.

The access point receives a first identifier for the licensed frequency band of the terminal, which facilitates the access point to, in a case that the base station is to communicate with the terminal via the unlicensed frequency band, in response to receiving information from the base station, provide services to the terminal based on the first identifier.

The base station transmits the information and the identifier for the licensed frequency band of the terminal to receive the information to the access point for the unlicensed frequency band, which facilitates the access point to, in a case that the base station is to communicate with the terminal via the unlicensed frequency band, in response to receiving information from the base station, provide services to the terminal based on the identifier.

Other implementations of the present disclosure will be apparent to those skilled in the art from consideration of the specification and practical examples of the present disclosure described herein.

It is to be understood that the present disclosure is not limited to the particular structures described above and shown in the accompanying drawings, and that various modifications and changes may be made without departing from the scope thereof. The scope of the present disclosure is limited only by the appended claims.

It shall be noted that the relational terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including . . . " shall not be precluded to include additional same elements present in a process, method, article or device including the elements.

The above are detailed description of a method and a device provided according to the examples of the present disclosure. Specific examples are used herein to set forth the principles and the implementing methods of the present disclosure, and the descriptions of the above examples are only meant to help understanding of the method and the core idea of the present disclosure. Meanwhile, those of ordinary skill in the art may make alterations to the specific examples and the scope of application in accordance with the idea of the present disclosure. In conclusion, the contents of the present specification shall not be interpreted as limiting the present disclosure.

The invention claimed is:

1. An identifier transmitting method, comprising:
  determining, by a terminal, an identifier for a licensed frequency band of the terminal; and
  transmitting, by the terminal via an unlicensed frequency band, the identifier to an access point for the unlicensed frequency band;
  determining a quality of communication with a base station via the licensed frequency band;
  in response to determining that the quality of communication is lower than a predetermined value, receiving, via the unlicensed frequency band, information which is from the base station and forwarded by the access point; and
  in response to determining that the quality of communication is higher than or equal to the predetermined value, receiving the information via the licensed frequency band.

2. The method according to claim 1, further comprising:
  in response to determining that the quality of communication is lower than the predetermined value, after receiving, via the unlicensed frequency band, the information which is from the base station and forwarded by the access point, re-determining the quality of communication with the base station via the licensed frequency band; and
  in response to determining that the re-determined quality of communication is higher than or equal to the predetermined value, communicating with the base station via the licensed frequency band based on the information.

3. The method according to claim 1, wherein the identifier comprises at least one of a temporary identifier or a permanent identifier.

4. An electronic device, comprising:
  a processor,
  a memory for storing executable instructions by the processor;
  wherein the processor is configured to perform the identifier transmitting method of claim 1.

5. An identifier receiving method, comprising:
  receiving, by an access point for an unlicensed frequency band, a first identifier transmitted by a terminal via the unlicensed frequency band, wherein the first identifier is an identifier determined by the terminal for a licensed frequency band of the terminal, and the first identifier enables the access point to provide services to the terminal based on the first identifier in a case that a base station is to communicate with the terminal via the unlicensed frequency band;

receiving information and a second identifier for the licensed frequency band of the terminal to receive the information, wherein the information and the second identifier are transmitted by a base station;

determining a target identifier from at least one of received first identifiers, wherein the target identifier is same as the second identifier; and transmitting, via the unlicensed frequency band, the information to a target terminal corresponding to the target identifier.

6. The method according to claim 5, wherein receiving the information and the second identifier for the licensed frequency band of the terminal to receive the information which are transmitted by the base station comprises:

receiving, via the licensed frequency band, the information and the second identifier transmitted by the base station.

7. The method according to claim 5, wherein receiving the information and the second identifier for the licensed frequency band of the terminal to receive the information which are transmitted by the base station comprises:

receiving, via Internet, the information and the second identifier transmitted by the base station.

8. The method according to claim 5, wherein the first identifier comprises at least one of a temporary identifier or a permanent identifier.

9. An electronic device, comprising:

a processor, a memory for storing executable instructions by the processor;

wherein the processor is configured to perform the identifier receiving method of claim 6.

10. An information transmitting method, comprising:

determining, by a base station, a target access point connected with a terminal via an unlicensed frequency band; and transmitting, by the base station, information and an identifier for a licensed frequency band of the terminal to receive the information to the target access point;

wherein the method further comprises:

before transmitting the information and the identifier for the licensed frequency band of the terminal to receive the information to the target access point, determining a quality of communication with the terminal via the licensed frequency band;

in response to determining that the quality of communication is lower than a predetermined value, transmitting the information and the identifier to the target access point; and in response to determining that the quality of communication is higher than or equal to the predetermined value, transmitting the information to the terminal via the licensed frequency band.

11. The method according to claim 10, wherein transmitting the information and the identifier for the licensed frequency band of the terminal to receive the information to the target access point comprises:

transmitting the information and the identifier to any access point that has a communication connection with the base station.

12. The method according to claim 10, wherein transmitting the information and the identifier for the licensed frequency band of the terminal to receive the information to the target access point comprises:

transmitting, via the licensed frequency band, the information and the identifier to the target access point.

13. The method according to claim 10, wherein transmitting the information and the identifier for the licensed frequency band of the terminal to receive the information to the target access point comprises:

transmitting, via Internet, the information and the identifier to the target access point.

14. An electronic device, comprising:

a processor, a memory for storing executable instructions by the processor;

wherein the processor is configured to perform the information transmitting method of claim 10.

* * * * *